United States Patent [19]
Bergerson et al.

[11] Patent Number: 5,344,186
[45] Date of Patent: Sep. 6, 1994

[54] INFLATOR ASSEMBLY

[75] Inventors: Lee D. Bergerson, Fountain Valley; Ivan L. Stonich, Hermosa Beach; William J. Sipes, Canyon Country, all of Calif.

[73] Assignee: TRW Vehicle Safety Systems Inc., Lyndhurst, Ohio

[21] Appl. No.: 996,665

[22] Filed: Dec. 24, 1992

[51] Int. Cl.5 ............................................. B60R 21/28
[52] U.S. Cl. .................................... 280/741; 102/530; 222/5; 280/736; 280/737
[58] Field of Search .................... 280/736 R, 737, 740, 280/741 R; 222/3, 5; 102/530

[56] References Cited

U.S. PATENT DOCUMENTS

| 1,690,890 | 11/1928 | De Gynst et al. | 102/530 |
| 3,806,153 | 4/1974 | Johnson | 137/68 |
| 3,822,895 | 7/1974 | Ochiai | 222/3 |
| 3,836,170 | 9/1974 | Grosch et al. | 222/5 |
| 3,868,124 | 2/1975 | Johnson | 102/37.7 |
| 3,895,821 | 7/1975 | Schotthoefer et al. | 222/5 |
| 5,022,674 | 6/1991 | Frantom et al. | 280/741 |
| 5,060,974 | 10/1991 | Hamilton et al. | 280/736 |
| 5,131,680 | 7/1992 | Coultas et al. | 280/737 |

Primary Examiner—Eric Culbreth
Attorney, Agent, or Firm—Tarolli, Sundheim & Covell

[57] ABSTRACT

An apparatus (10) for use in inflating a vehicle occupant restraint (12) includes a storage chamber (18) containing a mixture of gases which is releasable to inflate the vehicle occupant restraint (12). The mixture of gases includes a combustible fuel gas which, when burning, produces first combustion products which pressurize and supplement the mixture of gases. The apparatus (10) also includes an actuator assembly (16) for igniting the combustible fuel gas. The actuator assembly (16) includes a movable container (104) in which an ignitable material (122) is contained. The ignitable material (122) in the movable container (104), when burning, produces second combustion products which ignite the combustible fuel gas. The actuator assembly (16) casts the movable container (104) across the storage chamber when the second ignitable material (122) is burning.

14 Claims, 4 Drawing Sheets

INFLATOR ASSEMBLY

FIELD OF THE INVENTION

The present invention relates to an apparatus for inflating an inflatable vehicle occupant restraint, such as an air bag. More specifically, the present invention relates to opening a pressure vessel and igniting a combustible gas mixture contained in the pressure vessel.

BACKGROUND OF THE INVENTION

An apparatus for inflating an inflatable vehicle occupant restraint, such as an air bag, is disclosed in U.S. Pat. No. 5,131,680. The apparatus disclosed in the '680 patent includes a container which stores gas for inflating the vehicle occupant restraint. The apparatus further includes a body of pyrotechnic material and an igniter assembly for igniting the body of pyrotechnic material. The igniter assembly includes an ignition material which rapidly burns at a relatively high temperature to generate heat and flame which in turn initiate burning the body of pyrotechnic material. As the body of pyrotechnic material burns, flame and hot combustion products emitted by the body of pyrotechnic material pressurize and supplement the stored gas.

The apparatus disclosed in the '680 patent also includes an actuator assembly which operates in response to vehicle deceleration indicative of a collision. The actuator assembly is operable to actuate the igniter assembly and to rupture a burst disk to release a flow of gas from the container. The actuator assembly includes a an ignition material which, when ignited, generates pressure against the head of a piston to move the piston. The moving piston ruptures the burst disk and strikes the igniter assembly to ignite the ignition material of the igniter assembly. The ignition material, in turn, ignites the body of pyrotechnic material within the container.

SUMMARY OF THE INVENTION

In accordance with the present invention, an apparatus opens a sealed pressure vessel and ignites a combustible fuel and oxidizer gas mixture contained within the pressure vessel. The apparatus comprises supporting means for supporting an ignitable material which produces combustion products to ignite the gaseous combustible mixture. The apparatus further comprises moving means for moving the supporting means within the pressure vessel when the ignitable material is burning.

In a preferred embodiment of the invention, the supporting means is a movable container in which the ignitable material is contained. The moving means casts the movable container into and across the pressure vessel to disperse the combustion products throughout the gaseous combustible mixture in the pressure vessel. The gaseous combustible mixture is thus ignited by the combustion products substantially uniformly throughout the pressure vessel.

BRIEF DESCRIPTION OF THE DRAWINGS

The foregoing and other features of the present invention will become apparent to those skilled in the art to which the present invention relates from reading the following description with reference to the accompanying drawings, in which.

DESCRIPTION OF PREFERRED EMBODIMENTS

Figure 1:
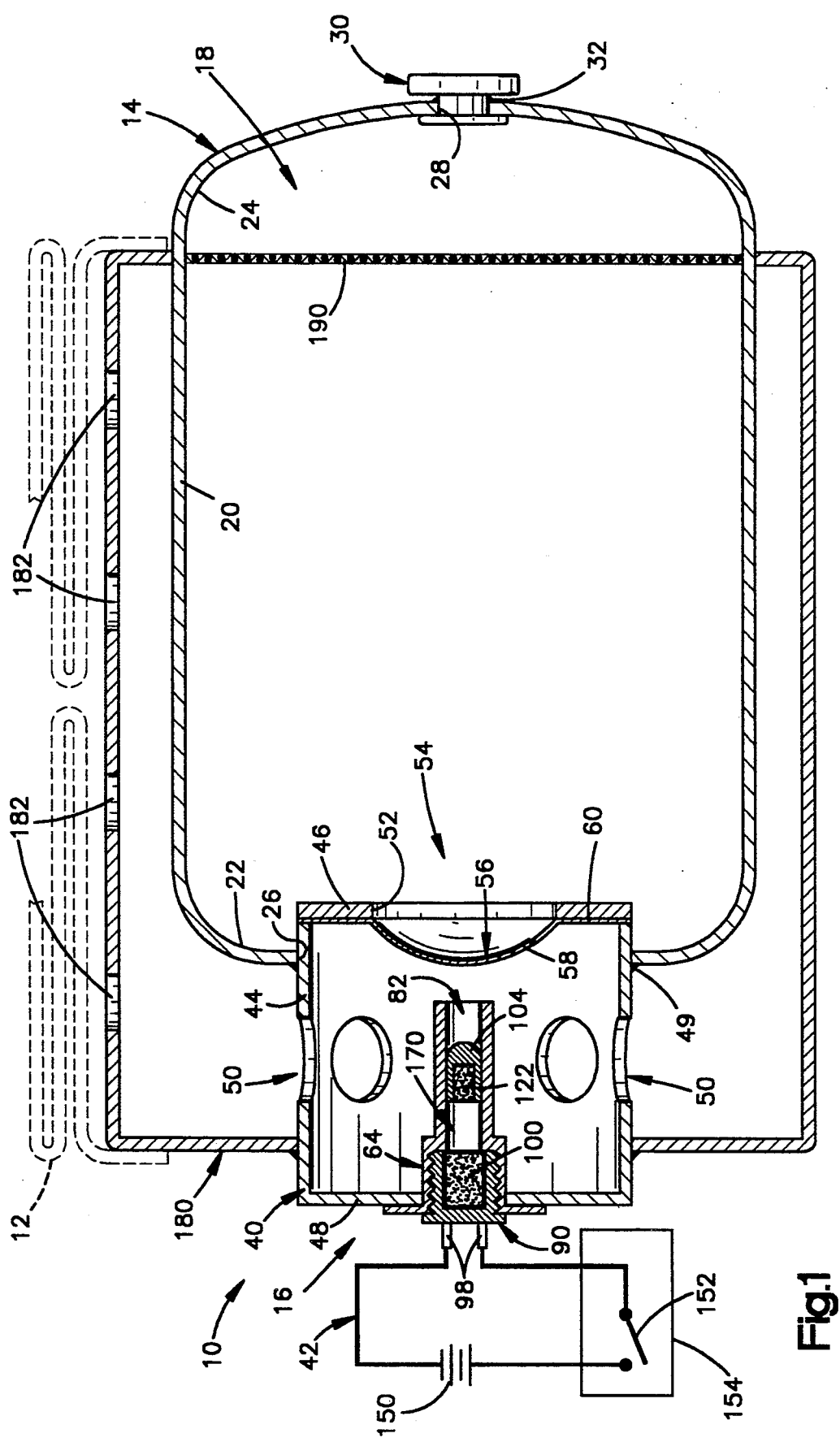
FIG. 1 is a schematic view of a vehicle occupant restraint apparatus constructed in accordance with the present invention.
Figure 2:
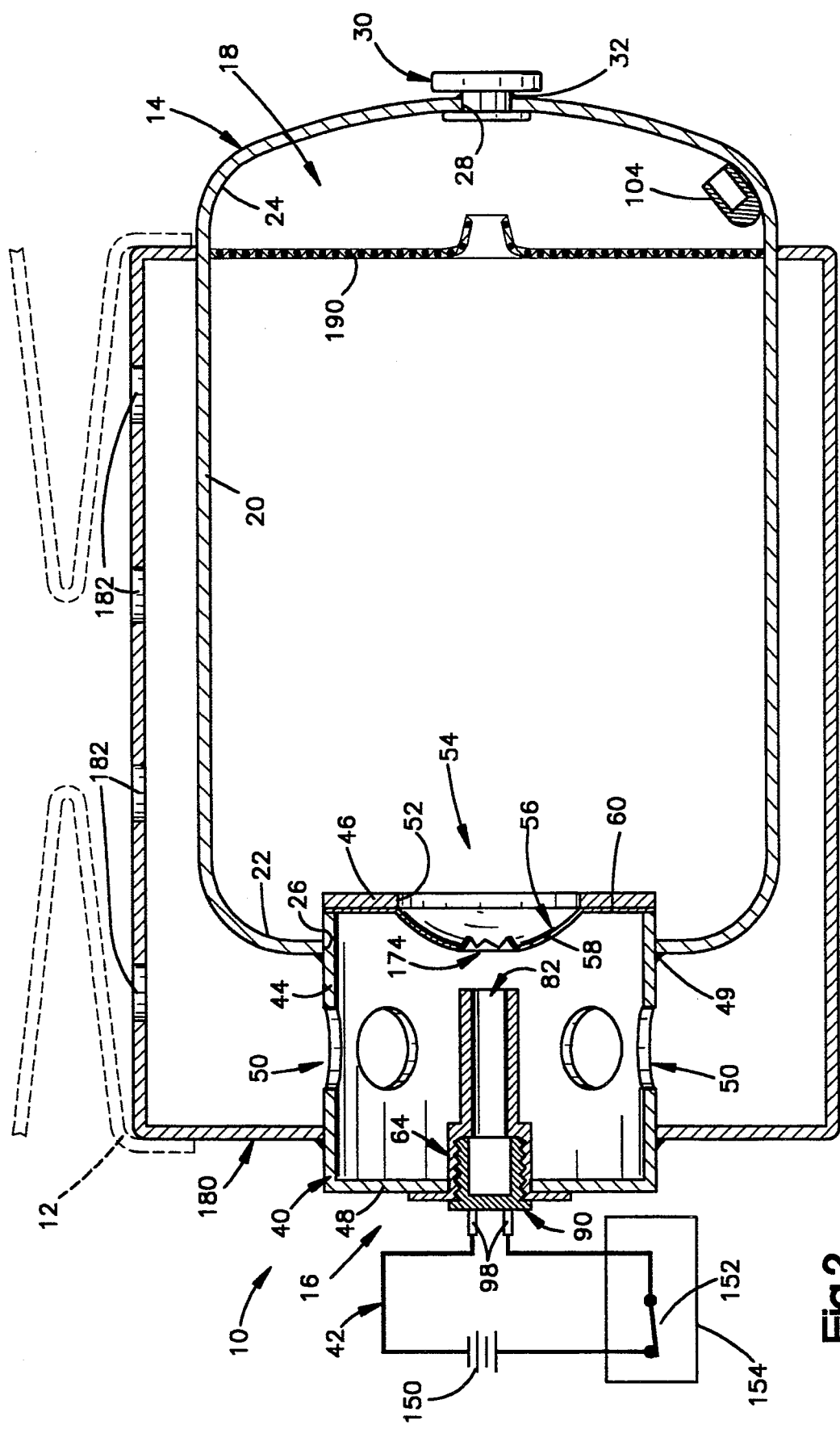
FIG. 2 is a view of the apparatus of FIG. 1 in a partially actuated condition.
Figure 3:
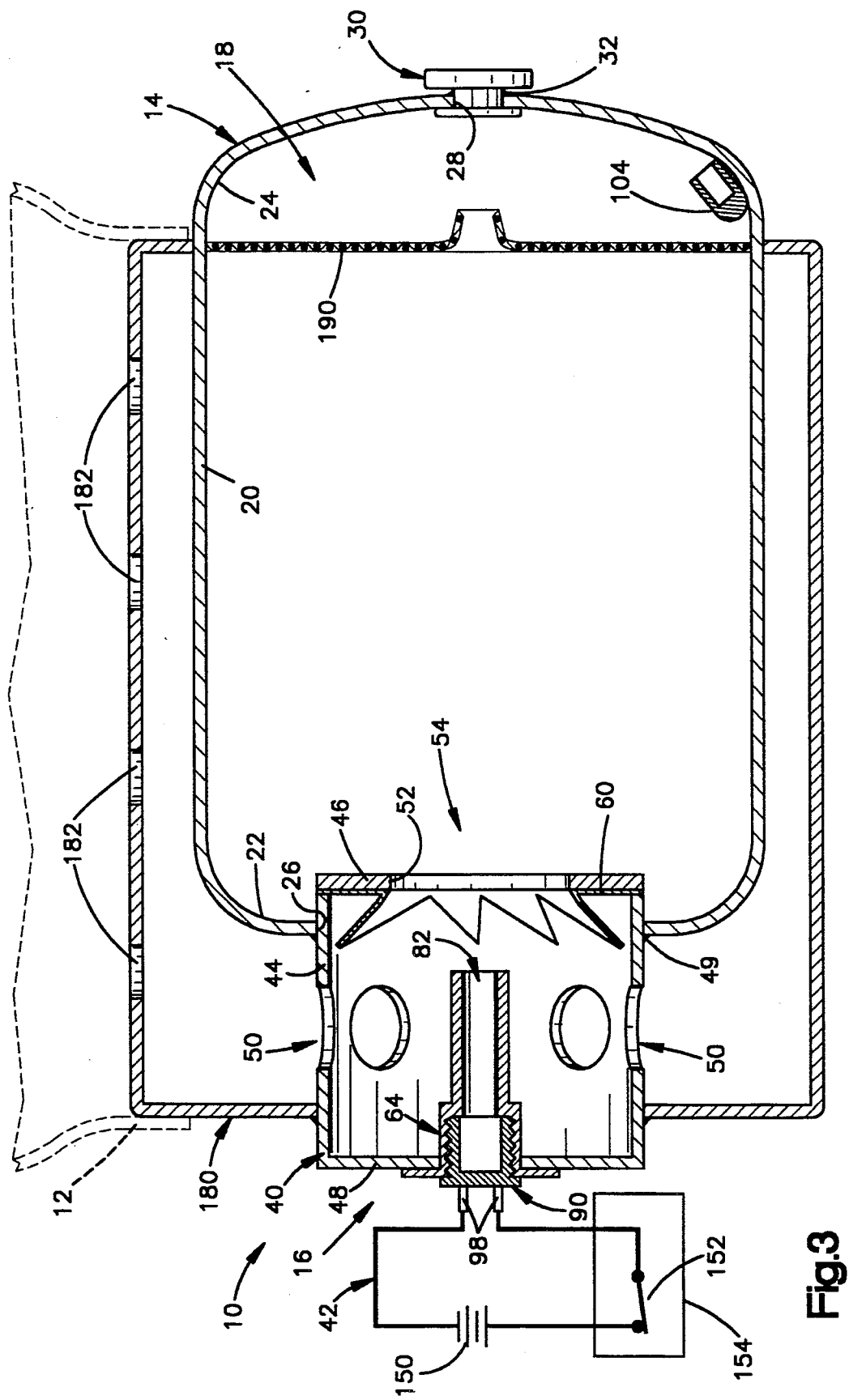
FIG. 3 is a view of the apparatus of FIG. 1 in a fully actuated condition.

A vehicle occupant restraint apparatus 10 constructed in accordance with the present invention is shown schematically in FIGS. 1–3. The apparatus 10 includes an inflatable vehicle occupant restraint 12, which is commonly referred to as an air bag. The apparatus 10 has an unactuated condition in which the air bag 12 is stored in a folded condition, as indicated in FIG. 1. The apparatus 10 also has a fully actuated condition in which the air bag 12 is fully inflated, as indicated in FIG. 3. The apparatus 10 is actuated in response to vehicle deceleration indicative of a collision. The air bag 12 is then inflated from the stored, folded condition to the fully inflated condition in which it restrains movement of a vehicle occupant and protects the vehicle occupant from forcibly striking parts of the vehicle.

The apparatus 10 further includes a storage container 14 and an actuating assembly 16. The storage container 14 has a sealed storage chamber 18 containing gas for inflating the air bag 12. The actuating assembly 16 opens the storage container 14 to release the gas from the storage chamber 18 upon the occurrence of vehicle deceleration indicative of a collision.

The storage container 14 has a cylindrical side wall portion 20, a first end wall portion 22 and a second end wall portion 24. The first end wall portion 22 of the storage container 14 has an annular inner edge surface 26 defining an opening extending through the first end wall portion 22. The second end wall portion 24 of the storage container 14 has an annular inner edge surface 28 which similarly defines an opening extending through the second end wall portion 24. An end cap 30 is closely received through the opening in the second end wall portion 24. A weld 32 blocks leakage of the gas from the storage chamber 18 between the edge surface 28 and the end cap 30. The end cap 30 has a passage (not shown) through which the gas is conducted into the storage chamber 18. When the storage chamber 18 has been filled with gas at a desired pressure, the passage in the end cap 30 is closed. The end cap 30 may also include a conventional pressure switch which monitors the gas pressure in the storage chamber 18 to alert an occupant of the vehicle if the gas pressure drops below a predetermined level.

The mixture of gases in the storage chamber 18 is combustible, and is preferably designed in accordance with the invention set forth in copending U.S. patent application Ser. No. 761,685, filed Sep. 19, 1991, entitled "Apparatus for Inflating a Vehicle Occupant Restraint." The mixture of gases thus includes a fuel gas, an oxidizer gas for supporting combustion of the fuel gas, and an inert gas. The inert gas is preferably nitrogen, argon or a mixture of nitrogen and argon. The oxidizer gas is preferably oxygen. The fuel gas is preferably hydrogen, but may be methane, or a mixture of hydrogen and methane.

Alternatively, the mixture of gases in the storage chamber 18 may be an oxidizer gas and a fuel gas in amounts which provide a very fuel lean mixture, i.e., the amount of oxidizer gas exceeds that amount required to support combustion of the fuel gas.

The mixture of gases in the storage chamber 18 readily combusts, when ignited, but otherwise is not explosive. As such, the mixture of gases could have many different compositions. The fuel gas may be 2 to 16 molar percent of the mixture of gases. The oxidizer gas may be 7 to 98 molar percent of the mixture of gases. The balance is inert gas which may be 0 to 91 molar percent of the mixture of gases. Preferably, the mixture of gases includes 10–14 molar percent hydrogen, 15–25 molar percent oxygen, and 61–75 molar percent inert gas. Most preferably, the mixture of gases includes 12.5 molar percent hydrogen and 20 molar percent oxygen, with the balance being nitrogen.

The mixture of gases in the storage container 14 is normally under pressure. The pressure depends upon such factors as the volume of the air bag 12 to be inflated, the time available for inflation, the inflation pressure desired, the volume of the storage chamber 18, and the percentage of each of the gases in the mixture of gases. Normally, the mixture of gases in the storage chamber 18 may be at a pressure of 500 to 5,000 pounds per square inch (psi). Preferably, the mixture of gases in the storage chamber 18 is at a pressure of 1,000 to 3,000 psi. However, the present invention is applicable to any mixture of gases regardless of pressure.

The actuating assembly 16 includes a manifold 40 and an electrical circuit 42. The manifold 40 has a cylindrical side wall 44, a first end wall 46 and a second end wall 48. The cylindrical side wall 44 of the manifold 40 is closely received through the opening in the first end wall portion 22 of the storage container 14. A weld 49 blocks leakage of the gas from the storage chamber 18 between the edge surface 26 and the cylindrical side wall 44.

The cylindrical side wall 44 of the manifold 40 further has a circumferentially extending array of gas flow openings 50. The first end wall 46 of the manifold 40 has an annular inner edge surface 52 defining a circular gas exit opening 54. The gas exit opening 54 is closed by a metal burst disk 56. The burst disk 56 has a bulged central portion 58 and a flat annular rim portion 60. The central portion 58 extends over the gas exit opening 54. The rim portion 60 is welded between the cylindrical side wall 44 and the first end wall 46 of the manifold 40. The burst disc 56 is thus supported in the manifold 40 between the gas exit opening 54 and the gas flow openings 50, and blocks the gas from flowing outward from the storage chamber 18 through the gas exit opening 54.

An actuator housing 64 also is supported in the manifold 40, as shown in FIGS. 1–3. As shown in enlarged detail in FIG. 4, the actuator housing 64 is a tubular member with a longitudinal central axis 66. The actuator housing 64 has a base portion 68 and a guide portion 70. The base portion 68 has a threaded inner surface 72 which defines a cylindrical base compartment 74. The guide portion 70 has an annular end surface 76 and a smooth cylindrical inner surface 78. The annular end surface 76 defines a circular opening 80. The smooth cylindrical inner surface 78 defines a guide passage 82 extending axially through the guide portion 70 from the base compartment 74 to the opening 80.

Figure 4:
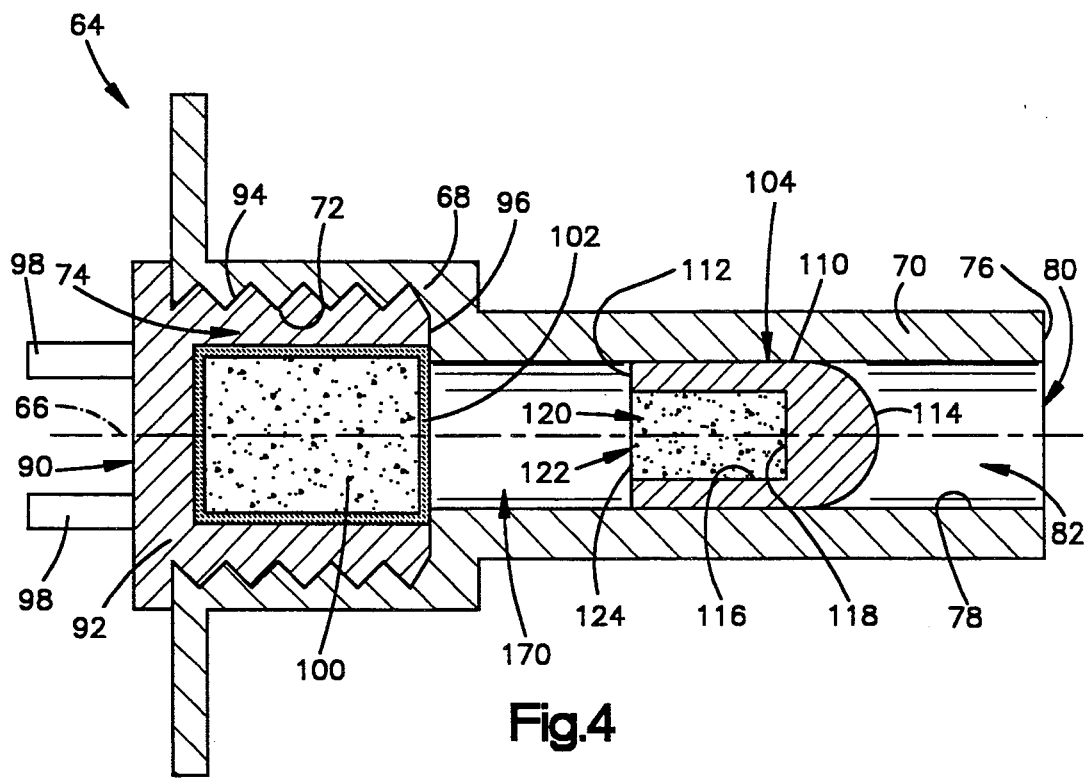
FIG. 4 is an enlarged view of parts of the apparatus of FIG. 1.

As further shown in FIG. 4, a squib 90 is supported within the actuator housing 64. The squib 90 includes a cylindrical casing 92. The casing 92 has a threaded outer surface 94, and has an annular front end surface 96 defining an opening at the front end of the squib 90. A pair of electrically conductive pins 98 extend into the casing 92. The casing 92 contains a pyrotechnic charge 100 in a ceramic envelope 102 which is hermetically sealed. The pyrotechnic charge 100 is ignited upon the passage of electric current through the squib 90 between the pins 98. The pyrotechnic charge 100 is preferably $ZrKClO_4$, but other known pyrotechnic charge materials can be used in the squib 90. When the pyrotechnic charge 100 in the squib 90 is ignited, it produces combustion products which rupture the envelope 102 to open the hermetic seal and emerge through the opening at the front end of the squib 90.

The casing 92 is screwed into the base compartment 74 of the actuator housing 64 with the opening at the front end surface 96 facing the guide passage 80. The squib 90 is thus supported by the actuator housing 64 in a position to direct the combustion products from the pyrotechnic charge 100 into the guide passage 80 in a direction extending along the axis 66.

The actuating assembly 16 further includes a movable container 104. As shown in enlarged detail in FIG. 4, the movable container 104 has a cylindrical side surface 110, an annular rear end surface 112, and a rounded front end surface 114. The movable container 104 further has a cylindrical inner surface 116 and a circular inner surface 118. The inner surfaces 116 and 118 are coaxial with the outer side surface 110, and together define a compartment 120 within the movable container 104. The compartment 120 thus has a cylindrical shape, with an open end at the annular rear end surface 112 and a closed end at the circular inner surface 118.

An ignitable material 122 is contained within the compartment 120 in the movable container 104. The movable container 104 supports the ignitable material 122. In the embodiment of the invention shown in the drawings, the ignitable material 122 fills the compartment 120 and has an exposed surface 124 extending across the open end of the compartment 120. The ignitable material 122 is preferably $BKNO_3$, but, as with the pyrotechnic charge 100, other known materials can be used as alternatives.

While the surface 124 is referred to herein as an exposed surface, the ignitable material 122 (like the ignitable material 100) preferably is protected from environmental conditions such as moisture. Such protection could be accomplished by a cap or a cover in the nature of a shell or possibly a wax coating (none of which are shown on the drawings).

When the vehicle occupant restraint apparatus 10 is in the unactuated condition shown in FIG. 1, the movable container 104 is located within the actuator housing 64, as shown in FIGS. 1 and 4. Specifically, the movable container 104 has an unactuated position in which it is closely received coaxially within the guide passage 82 in the guide portion 70 of the actuator housing 64. When the movable container 104 is located in its unactuated position, the cylindrical outer side surface 110 of the movable container 104 is closely received against the cylindrical inner surface 78 of the guide portion 70 with a releasable interference fit. The interference fit can be supplemented with a crimp in the guide portion 70 of the actuator housing 64, or with a shear pin or the like. Additionally, the exposed surface 124 of the ignitable material 122 faces axially toward the opening at the front end surface 96 of the squib 90.

As noted above, the actuating assembly 16 further includes an electrical circuit 42. The electrical circuit 42 includes a power source 150, which is preferably the vehicle battery and/or a capacitor, and a normally open switch 152. The switch 152 is preferably part of a vehicle deceleration sensor 154. The deceleration sensor 154 senses vehicle deceleration which is indicative of a collision, and closes the switch 152 in response to such vehicle deceleration. Such a deceleration sensor is known in the art. The electrical circuit 42 extends through the squib 90 between the pins 98, and actuates the squib 90 when the switch 152 is closed.

When the vehicle experiences a collision, the deceleration sensor 154 senses the deceleration of the vehicle that is caused by the collision and closes the switch 152. When the switch 152 is closed, electric current passes through the squib 90 between the pins 98. The pyrotechnic charge 100 in the squib 90 is then ignited, and produces combustion products which rupture the envelope 102 and emerge from the squib 90. The combustion products emerging from the squib 90 move into a space 170 in the guide passage 82 between the squib 90 and the movable container 104, and move axially across the space 170 to the movable container 104. When the combustion products from the squib 90 reach the movable container 104, they ignite the ignitable material 122 in the movable container 104 at the surface 124 of the ignitable material 122. The ignitable material 122 then produces combustion products which are emitted from the open end of the compartment 120 and directed into the space 170. Any environmental protection over the surface 124 is destroyed.

When the pyrotechnic charge 100 and the ignitable material 122 are burning, the combustion products are initially contained in the space 170 between the squib 90 and the movable container 104. The gaseous components of the combustion products in the space 170 increase in pressure as the pyrotechnic charge 100 and the ignitable material 122 burn. The squib 90 is securely held in the base compartment 74 by the engaged threads. However, the movable container 104 is releasably held in the guide passage 82 by the interference fit. When the increasing gas pressure in the space 170 reaches a predetermined elevated level, the force of the gas pressure acting axially against the movable container 104 becomes great enough to overcome the interference fit. The force of the gas pressure then moves the movable container 104 from its unactuated position and out of the guide passage 82 in the actuator housing 64 toward the burst disk 56.

The movable container 104 is moved out of the actuator housing 64 forcefully enough to puncture a hole 174 through the burst disk 56, as shown in FIG. 2. The movable container 104 thus opens the storage container 14 to release the mixture of gases from the storage chamber 18. The mixture of gases then flows outward through the gas exit opening 54, and further through the manifold 40 from the hole 174 in the burst disk 56 to the gas flow openings 50. A diffuser 180 with a plurality of gas exit openings 182 then directs the gas to flow from the manifold 40 to the air bag 12.

Additionally, the movable container 104 is moved out of the actuator housing 64 forcefully enough to continue moving to the right, as viewed in FIGS. 1–3, through the burst disk 56 and across the storage chamber 18 in the storage container 14. Thus, burning the pyrotechnical charge 100 causes a pressure force which casts the movable container 104 out of the actuator housing 64, through the burst disk 56 and across the storage chamber 18. The movable container 104 carries the ignitable material 122 through the mixture of gases in the storage chamber 18 when the ignitable material 122 is burning. The combustion products generated by the ignitable material 122 include heat, hot particles and hot gases. These combustion products continue to be emitted from the compartment 120 in the movable container 104 as the movable container 104 moves through the mixture of gases, and are thus dispersed in the mixture of gases sufficiently to ignite the fuel gas substantially uniformly and rapidly throughout the storage chamber 18.

When the fuel gas burns in the mixture of gases, it generates heat and gaseous products of combustion which increase the temperature and pressure of the mixture of gases. When the increasing pressure of the mixture of gases reaches a predetermined elevated level, the force of the pressure acting outward against the burst disk 56 becomes sufficient to rupture the burst disk 56 further from the condition shown in FIG. 2 to the fully ruptured condition shown in FIG. 3. The pressurized mixture of gases then rushes outward through the gas exit opening 54 past the fully ruptured burst disk 56 and into the air bag 12. As in the apparatus disclosed in the copending application noted above, the fuel gas is consumed before it reaches the gas exit openings 182 in the diffuser 180. The air bag 12 is thus inflated quickly to its fully inflated condition by the gas which is pressurized upon burning of the fuel gas in the mixture of gases.

The operation of the vehicle occupant restraint apparatus 10 can be controlled in a number of ways. For example, the amounts and compositions of the pyrotechnic charge 100 in the squib 90 and the ignitable material 122 in the movable container 104 are variables which determine the rate at which the pressure will increase in the space 170 between the squib 90 and the movable container 104. The rate at which the pressure increases in the space 170 will affect the time and the speed with which the movable container 104 enters the storage chamber 18. The speed with which the movable container 104 moves through the mixture of gases, and the amount of the ignitable material 122 which continues to burn as the movable container 104 moves through the mixture of gases will, in turn, affect the amount and rate at which the combustion products are dispersed in the mixture of gases to ignite the fuel gas. In the preferred embodiment of the invention, the movable container 104 is cast through the storage chamber 18 from the gas exit opening 54 to the second end wall portion 24 of the container 14. The second ignitable material 122 continues to spew combustion products into the mixture of gases at least until the movable container 104 reaches the second end wall portion 24. This ensures that the fuel gas is ignited uniformly.

The size of the movable container 104 also affects the operation of the apparatus 10. In the preferred embodiment of the invention shown in the drawings, the movable container 104 is large enough to weaken the burst disk 56 sufficiently upon puncturing the hole 174 (FIG. 2) so that the pressurized gas in the storage chamber 18 can fully rupture the burst disk 56 (FIG. 3), as described above. In this respect, the preferred embodiment of the invention includes a screen 190 in the storage chamber 18 which is punctured by the movable container 104, and which captures the movable container 104 at the far end of the storage chamber 18. The screen 190 thus prevents the movable container 104 from blocking the flow of gas outward through the manifold 40 and the diffuser 180. A smaller movable container could be used in an alternative embodiment of the invention. In that case, the burst disk 56 could be scored if necessary to enable the pressurized gas to rupture the burst disk 56 fully at the desired time.

Figure 5A:
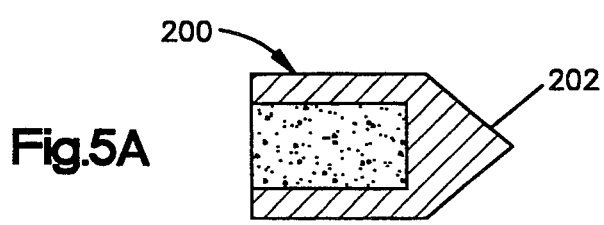
FIGS. 5a–5c are views of alternative embodiments of a part of the apparatus of FIG. 1.
Figure 5B:
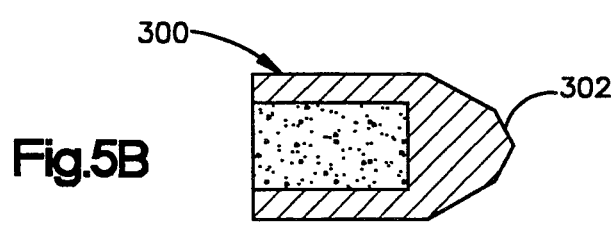
Figure 5C:
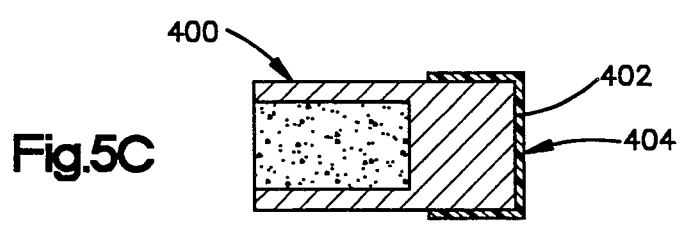

The shape of the movable container 104 is another variable which affects the operation of the apparatus 10. Alternative embodiments of a movable container constructed in accordance with the invention, each having a shape different from the shape of the movable container 104, are shown in FIGS. 5a-5c. The movable containers 200 and 300 shown in FIGS. 5a and 5b have pointed and chisel-shaped front end surfaces 202 and 302, respectively. Each of the movable containers 200 and 300 will puncture and weaken the burst disk 56 differently, and will have a correspondingly different effect on the operation of the apparatus 10. The movable container 400, shown in FIG. 5c, has a flat front end surface 402 which likewise will puncture and weaken the burst disk 56 differently. As further shown in FIG. 5c, a foil cap 404 is supported on the front end portion of the movable container 400. The foil cap 404 tightens the interference fit of the movable container 400 in the guide portion 70 of the actuator housing 64 when the movable container 400 is in its unactuated position.

From the foregoing description of the invention, those skilled in the art will perceive improvements, changes and modifications. Such improvements, changes and modifications within the skill of the art are intended to be covered by the appended claims.

Having described the invention, the following is claimed:

1. An apparatus for use in inflating a vehicle occupant restraint, said apparatus comprising:
    means defining a storage chamber for storing gas which is releasable to inflate the vehicle occupant restraint, and for containing a first ignitable material which produces first combustion products to pressurize and supplement the stored gas;
    actuator means for igniting the first ignitable material, said actuator means including supporting means for supporting a second ignitable material which produces second combustion products to ignite the first ignitable material; and
    said actuator means further including moving means for moving said supporting means within said storage chamber when said second ignitable material is burning.

2. An apparatus as defined in claim 1 wherein said first ignitable material is a combustible fuel gas contained within said storage chamber.

3. An apparatus as defined in claim 1 wherein said supporting means comprises a movable container in which said second ignitable material is contained, said moving means including means for casting said movable container across said storage chamber.

4. An apparatus as defined in claim 3 wherein said movable container has an opening to the exterior of said movable container through which combustion products from ignition of said second ignitable material flow.

5. An apparatus as defined in claim 3 wherein said moving means supports said movable container at a location outside of said storage chamber, said moving means being responsive to an actuating signal to move said movable container into said storage chamber.

6. An apparatus as defined in claim 5 wherein said storage chamber has a rupturable wall, said moving means moving said movable container against said rupturable wall to rupture said rupturable wall in response to said actuating signal.

7. An apparatus as defined in claim 6 wherein said igniter means further includes means for generating said actuating signal in response to vehicle deceleration.

8. An apparatus as defined in claim 7 wherein said first ignitable material is combustible fuel gas contained within said storage chamber.

9. An apparatus for opening a sealed pressure vessel and for igniting a combustible fuel and oxidizer gas mixture contained within the pressure vessel, said apparatus comprising:
    supporting means for supporting an ignitable material which produces combustion products to ignite the combustible gas mixture; and
    moving means for moving said supporting means within the pressure vessel when said ignitable material is burning.

10. An apparatus as defined in claim 9 wherein said supporting means comprises a movable container in which said ignitable material is contained, said moving means including means for casting said movable container across the pressure vessel.

11. An apparatus as defined in claim 10 wherein said movable container has an opening through which combustion products from ignition of said ignitable material flow to the exterior of said movable container.

12. An apparatus as defined in claim 10 wherein said moving means supports said movable container at a location outside of the pressure vessel, said moving means being responsive to an actuating signal to move said movable container into the pressure vessel.

13. An apparatus as defined in claim 12 wherein the pressure vessel has a rupturable wall, said moving means moving said movable container against the rupturable wall to rupture the rupturable wall in response to said actuating signal.

14. An apparatus as defined in claim 13 further comprising means for generating said actuating signal in response to vehicle deceleration.

* * * * *